United States Patent Office 3,826,616
Patented July 30, 1974

3,826,616
METHOD OF DIAGNOSING PREGNANCY IN MILK-PRODUCING ANIMALS BY PROGESTAGEN ASSAY
John Archibald Laing, Lower Meadow,
Ayot St. Lawrence, Welwyn, England
No Drawing. Filed July 18, 1972, Ser. No. 272,947
Claims priority, application Great Britain, July 22, 1971, 34,519/71
Int. Cl. G01n 33/04, 33/16
U.S. Cl. 23—230 B
10 Claims

ABSTRACT OF THE DISCLOSURE

Method of diagnosing the condition of pregnancy in milk-producing animals wherein the milk of the inseminated animal is subjected to progestagen assay to detect an increase in progestagen concentration therein.

---

This invention relates to a novel method of testing for pregnancy in milk-producing domestic animals.

In the raising of milk-producing domestic animals such as goats and, in particular, cattle, both for milk and for meat production, it would be valuable to be able routinely to monitor the incidence of pregnancy to ensure a planned rate of reproduction. Animals found not to be pregnant after impregnation could then be taken again to the male, or, if not pregnant after several attempts, be judged infertile. By the term impregnation we mean insemination, which may be either natural, i.e., mating, or artificial.

Up to the present time, accurate diagnosis of pregnancy has depended on clinical examination and especially on physical examination of the uterus and ovaries; even at a late stage of pregnancy it is often difficult to detect pregnancy merely by increase in the outer physical characteristics of the animal. Such examination of the uterus and ovaries is often unsuitable for routine application on economic grounds and because skilled diagnosticians are not always available; methods based on examination of blood or urine samples would also be relatively expensive due to the extra labour required in taking samples.

We have now found that pregnancy can be assessed by estimating the concentration of progestagens such as progesterone or metabolites thereof in the milk of the animal under test. Samples of milk are far easier to take than samples of blood or urine and in many cases will routinely be available in normal milk production.

Although it has previously been proposed to test for pregnancy by estimating progestagens in blood and urine, it was not previously known that these would cross the mammary gland in sufficient quantities for an estimation to be made nor was it known that the level of progestagens in milk at an appropriate time after pregnancy could be distinguishable from the level at mid-cycle where blood progesterone is particularly high. Our finding that the milk progestagen concentrations permit a pregnant animal to be detected and distinguished from an animal in mid-cycle, even when the ovarian status is not definitely known, makes available for the first time a simple method of routine testing which will be relatively economical on a large scale.

According to the present invention we provide a method of diagnosing the condition of pregnancy in milk-producing animals wherein the milk of the inseminated animal is subjected to progestagen assay to detect an increase in progestagen concentration therein.

In the breeding of cattle, where the period of gestation is about 9 months, it is common practice to inseminate about 3 months after calving in order to achieve an overall period between parturitions of about 1 year. However, the ovarian cycle of the cow is inevitably disturbed after calving and has usually only just returned to normal a little before the end of the 3-month period.

Since insemination is not always successful, it is important to have available a method of diagnosing whether or not a cow is pregnant at an early stage after insemination, so that a second insemination can take place when a negative result has been obtained. Insemination is normally carried out on the first day of the 21-day cycle, so that it is necessary to wait for the beginning of the new cycle where a second insemination is required. The method of diagnosing should therefore be rapid and accurate as well as being economical in operation.

It is further found that the levels of progestagens in the milk are commonly higher during early pregnancy than late pregnancy. Consequently, it is advantageous to carry out the progestagen assay not later than 200 days after insemination and preferably within the first 85 days after insemination. In general it is preferred to test within 65 days after insemination.

It is preferred, in general that the progestagen assay be carried out at an early stage; however, reliable results cannot usually be obtained earlier than 20 days after insemination.

The progestagen concentrations in the milk of pregnant cows are found to increase with time after insemination although there are variations in level. Such variations may include low levels which could be confused with relatively high levels which occasionally occur in non-pregnant cows due to cycle irregularities. However, after about 50–60 days, e.g. 55 days or even slightly later, e.g. 60 days, the concentrations of progestagen are particularly high and such confusion is less likely than at an earlier stage. On the other hand, quite accurate results can generally be obtained after a shorter time, e.g. 20–28 days after insemination, and this period is used in practice if early results are required.

One way of combatting irregularities in progestagen levels is to conduct sequential tests on milk produced at intervals of a few days. At about 20–28 days after insemination, the intervals are advantageously 3 or 4 days. Non-pregnant cows are identifiable since, in general, it is found that the pattern of progestagen levels in pregnant cows is different from that in non-pregnant cows.

Where the sequential tests do not show one or more levels well below the mid-cycle value found in non-pregnant cows (about 6 ng. progestagen per ml. milk), the pregnancy test can be taken to be positive. It will be appreciated that a corresponding sequential series of tests on plasma or even urine would be extremely expensive whereas the ready availability of the milk for such tests makes such seqential testing a practical possibility.

It should be noted that sequential testing can also show up a pathological pattern of progestagen production in non-pregnant cows which is of assistance in diagnosing the cause of infertility. If the ovarian cycle is observed to have been interrupted it is usually thought that the cow must be pregnant. A sequential series of tests can show, however, a return to low progestagen levels characteristic of the ovarian cycle of a non-pregnant cow. In some cases such examination can also suggest whether or not a pregnancy failure is likely. The preferred times for such sequential tests are in the 20–30 day period at 3–4 day intervals or in the 50–70 day period at 5–6 day intervals. In each case a low progestagen level will indicate a return to non-pregnant ovarian status and by spacing the tests it will be possible to eliminate high results due to corpus luteum activity during the cycle and discriminate between levels associated with pregnancy and periodic high levels in cyclic (i.e. non-pregnant) animals.

Progesterone may be estimated in milk by the protein-binding method of J. M. Bassett et al. (J. Endocrinology 45, 449–457, 1969) or B. P. Murphy (J. Clin. Endocr. Metab. 27, 973–990, 1967) Petroleum ether extracts may be defatted by addition of 70% aqueous methanol and allowed to stand at −15° C. to deposit lipids which can then be removed by centrifugation.

Alternatively, the radioimmunoassay method of Abraham, Swerdhoff, Tulchinsky and Odell (J. Chim. Endocr. 32, 619, 1971) may be applied directly to a petroleum ether extract of the milk without defatting. This method has not previously been applied to milk; we have found that it is possible to omit the purification step using column chromatography which was used by the Abraham et al. in plasma so that the procedure is simple to perform and is particularly suitable for large scale analysis.

Although applicable to other domestic milk producing animals, the new method of pregnancy diagnosis is naturally of greatest value in relation to cattle.

According to a further feature of the invention we provide a method of insemination of milk producing animals wherein the animal is inseminated and progestagens in the milk yielded by the animal are subsequently assayed to determine the condition of pregnancy of the animal. Insemination may be by natural or artificial means.

The following Examples are given by way of illustration only:

EXAMPLE 1

Milk samples were obtained from cows in two herds, one British Friesian (A) and the other Jersey (B). They were taken from the whole volume of milk obtained at an afternoon milking on two occasions in the case of herd A and as a mixed sample of all quarters before morning milking on two occasions from herd B. Samples were deposited at −15° C. within six hours of being taken and kept at that temperature until analyzed except for about one hour when they were taken from one laboratory to another when they thawed slightly.

Milk samples were analyzed for progesterone by a competitive protein binding assay based on the method of Bassett et al. (1996) as set out below. Petroleum ether extracts were "defatted" by the addition of 1 ml. 70% methanol (A.R.), allowed to stand 48 hours at −15°, and centrifuged to compact the lipid deposit. The results have been corrected for procedural losses which were, on average 25%.

The progesterone cencentration of milk from cows known to be oestrus or anoestrus was 1.7 (10 cows). In cows known not to be pregnant (32 cows) and at different stages of the oestrus cycle the mean concentration was 4.22±0.57 ng./ml. The level where a mid-cycle corpus luteum was present varied from 1.44 to 6.05 ng./ml. with a mean value of about 4.8 ng./ml.

In experiments using animals known from later clinical examination to be pregnant progesterone concentration in milk rose over the initial period of gestation, the highest values being obtained in animals between 35 and 83 days pregnant, with a tendency for values to drop towards the end of pregnancy. The results are shown in Table 1. It will be seen that in the period 50–60 days after insemination the progestagen level rose to 17.52±1.40 ng./ml.

The progesterone assay was carried out in the following way:

Milk samples stored at −15° were allowed to thaw slowly. Portions (0.5–1.0 ml.) were extracted with 6 ml. petroleum ether (40–60°) after the addition of 0.1 ml. 2.5% NaOH and the organic phase washed twice with distilled water. After evaporation of the petroleum ether the lipid extract was taken up in 1.0 ml. 70% aqueous methanol and allowed to stand at −15° for about 72 hours. An aliquot (0.5 ml.) of the supernatant was transferred to a small glass vial. The extract was then partitioned between the aqueous methanol (0.5 ml.) light petroleum (2.5 ml.) and distilled water (1.0 ml.), the progesterone passing into the light petroleum supernatant. This fraction was transferred to a stoppered glass tube, evaporated to dryness and the progesterone measured by a competitive protein binding assay (CPB).

The CPB assay depends on the use of a plasma protein solution (isolated from dogs) containing a high concentration of corticosteroid-binding globulin (CBG) to which is added tritiated corticosterone. An aliquot of this protein was added to the isolated progesterone (which competes with $^3$H-corticosterone for binding sites on CBG.). The amount of $^3$H-corticosterone not displaced from the protein by progesterone was measured using Sephadex G-25 column chromatography, and is inversely proportional to the amount of progesterone present in the sample. The amount of radioactivity bound to the CBG was monitored by liquid scintillation spectrometry and converted to a concentration of progesterone from prepared standard lines.

TABLE 1

| Days after insemination: | Progesterone conc. (ng./ml.$^{-1}$) |
|---|---|
| 0–10 | 5.06±1.45 *(13) |
| 11–20 | 7.25±1.23 (18) |
| 21–30 | 8.74±1.23 (18) |
| 31–40 | 8.26±1.40 (14) |
| 41–50 | 6.79±1.58 (11) |
| 51–60 | 17.25±1.40 (14) |

*No. of cows given in parenthesis.

EXAMPLE 2

Milk samples were taken from 5 impregnated cows on days 20, 24 and 28 after insemination and stored at 15° C. until analyzed.

After thawing at room temperature, 10–100 μl. portions of these samples (unknown concentration) were placed in small glass vials. A further series of vials was prepared containing, (a) known amounts of progesterone and (b) aliquots of milk from a noncycle, lactating cow (containing little or no detectable progesterone), comparable in volume to the unknown samples. After the addition of 500 μl. buffer solution to all samples they were extracted with 5 ml. petroleum ether (b.p. 40–60° C.). The petroleum ether was decanted and evaporated to dryness as described by Challis, Heap & Illingsworth (1971). Radio-immunoassay of progesterone was carried out by the method of Abraham, Swerdhoff, Tulchinsky & Odell (J. Chim. Endocr. 32, 619, 1971), moitting purification of the milk extract by column chromatography.

The progestagen levels for the five cows are shown in Table 2. The value for the non-cyclic, lactating cow was 1.7 ng./ml. and in assessing the values given in Table 2 this concentration should in each case be subtracted. The condition of pregnancy of each cow was determined by independent veterinary examination. It can be seen that the pregnant cows Nos. 1–4 all showed relatively uniform progestagen levels whereas the non-pregnant cow No. 5 showed a very low value at day 24, indicating a return to oestrus.

TABLE 2

| Cow number | Progestagen concentration in milk ng./ml. | | | | |
|---|---|---|---|---|---|
| | 1 | 2 | 3 | 4 | 5 |
| Days after impregnation: | | | | | |
| 20 | 13.2 | 5.7 | 6.1 | 5.6 | 6.0 |
| 24 | 12.0 | 6.2 | 7.2 | 5.9 | 1.7 |
| 28 | 12.3 | 6.7 | 7.1 | 8.1 | -------- |
| Independent veterinary | P | P | P | P | Non-P |

NOTE.—Diagnosis: P=pregnant.

What is claimed is:

1. A method of diagnosing the condition of pregnancy in an inseminated milk-producing animal, comprising assaying the progestagen level of the milk of said animal and comparing the level found with the progestagen level associated with a non-pregnant condition.

2. A method as claimed in claim 1 in which progestagen level is estimated by a protein binding method after removal of lipids from the milk.

3. A method as claimed in claim 1 in which the milk is subjected to progestagen assay at intervals to that fluctuations in progestagen level can be detected.

4. A method as claimed in claim 3 in which the assay is effected at 3 or 4 day intervals in the period 20–28 days after insemination.

5. A method as claimed in claim 3 in which the assay is effected at 5 or 6 day intervals in the period 50–70 days after insemination.

6. A method as claimed in claim 1 in which said animal is a cow.

7. A method as claimed in claim 6 in which the milk is subjected to progestagen assay at least 20 days after insemination.

8. A method as claimed in claim 7 in which progestagen level is estimated by a radioimmunoassay on whole milk.

9. A method as claimed in claim 6 in which the milk is subject to progestagen assay within 85 days after insemination.

10. A method as claimed in claim 9 in which the milk is subjected to progestagen assay within 55 days after insemination.

References Cited

UNITED STATES PATENTS

| | | | |
|---|---|---|---|
| 3,236,732 | 2/1966 | Arquilla | 23—230 B X |
| 3,248,173 | 4/1966 | Stauch | 23—230 B |
| 3,278,270 | 10/1966 | Fossel | 23—230 B |
| 3,298,787 | 1/1967 | Fossel | 23—230 B |
| 3,345,138 | 10/1967 | Eberhard | 23—230 B |
| 3,595,620 | 7/1971 | Gordon | 23—230 B |
| 3,615,229 | 10/1971 | Besch | 23—230 B |

OTHER REFERENCES

W. F. Williams, J. Dairy Sci. *45* (12), 1541-2 (1962).

R. S. Thompson et al., J. Dairy Sci., *52* (12), 2048-50 (1969).

MORRIS O. WOLK, Primary Examiner

S. MARANTZ, Assistant Examiner

U.S. Cl. X.R.

23—231; 119—1; 128—24